United States Patent
Choi et al.

(10) Patent No.: US 10,930,434 B2
(45) Date of Patent: Feb. 23, 2021

(54) MULTI-LAYERED CERAMIC ELECTRONIC COMPONENT

(71) Applicant: SAMSUNG ELECTRO-MECHANICS CO., LTD., Suwon-si (KR)

(72) Inventors: Du Won Choi, Suwon-si (KR); Ji Hong Jo, Suwon-si (KR); Seok Kyoon Woo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1 day.

(21) Appl. No.: 16/353,489

(22) Filed: Mar. 14, 2019

(65) Prior Publication Data

US 2020/0194178 A1    Jun. 18, 2020

(30) Foreign Application Priority Data

Dec. 12, 2018 (KR) .......................... 10-2018-0160025

(51) Int. Cl.
*H01G 4/012* (2006.01)
*H01G 4/12* (2006.01)
*H01G 4/248* (2006.01)
*H01G 4/30* (2006.01)

(52) U.S. Cl.
CPC .......... *H01G 4/1227* (2013.01); *H01G 4/012* (2013.01); *H01G 4/248* (2013.01); *H01G 4/30* (2013.01)

(58) Field of Classification Search
CPC ........ H01G 4/1227; H01G 4/012; H01G 4/30; H01G 4/248
See application file for complete search history.

(56) References Cited

U.S. PATENT DOCUMENTS

| 5,319,517 | A | * | 6/1994 | Nomura | H01G 4/1245 361/321.4 |
| 5,889,647 | A | * | 3/1999 | Hansen | H01G 4/1227 361/311 |
| 6,078,494 | A | * | 6/2000 | Hansen | H01G 4/1227 361/321.5 |

(Continued)

FOREIGN PATENT DOCUMENTS

| JP | 2011-018874 A | 1/2011 |
| JP | 2014-220324 A | 11/2014 |
| KR | 10-2000-0017250 A | 3/2000 |

*Primary Examiner* — Noah S Wiese
(74) *Attorney, Agent, or Firm* — Morgan, Lewis & Bockius LLP (57) ABSTRACT

A multi-layered ceramic electronic component includes a ceramic body including a dielectric layer, and a plurality of first and second internal electrodes opposing each other with the dielectric layer interposed therebetween; and first and second external electrodes arranged outside of the ceramic body and electrically connected to the first and second internal electrodes, wherein the dielectric layer comprises a dielectric ceramic composition containing: a base material represented by $(Ba_{1-x}Ca_x)TiO_3$ ($0<x\leq0.09$) as a main component, Y as a first accessory component, Mg as a second accessory component, Ba or Zr, or a mixture thereof, as a third accessory component, Mn, Ni, W, V, or Fe, or mixtures thereof, as a fourth accessory component, and Si as a fifth accessory component.

19 Claims, 4 Drawing Sheets

(56) References Cited

U.S. PATENT DOCUMENTS

| | | | |
|---|---|---|---|
| 6,243,254 B1 | 6/2001 | Wada et al. | |
| 6,960,547 B2 * | 11/2005 | Matoba | C04B 35/4682 |
| | | | 361/321.5 |
| 7,541,305 B2 * | 6/2009 | Ito | B32B 18/00 |
| | | | 501/135 |
| 8,264,817 B2 * | 9/2012 | Nakamura | C04B 35/4682 |
| | | | 361/306.1 |
| 2011/0007449 A1 | 1/2011 | Seo et al. | |
| 2016/0099107 A1 * | 4/2016 | Lee | H01G 2/065 |
| | | | 174/260 |

* cited by examiner

MULTI-LAYERED CERAMIC ELECTRONIC COMPONENT

CROSS-REFERENCE TO RELATED APPLICATION

This application claims benefit of priority to Korean Patent Application No. 10-2018-0160025 filed on Dec. 12, 2018 in the Korean Intellectual Property Office, the disclosure of which is incorporated herein by reference in its entirety.

TECHNICAL FIELD

The present disclosure relates to a multi-layered ceramic electronic component, and more particularly, to a high-capacity multi-layered ceramic electronic component having excellent reliability.

BACKGROUND

In recent years, miniaturization, slimming and multifunctionalization of electronic products have demanded miniaturization of multi-layered ceramic capacitors, and mounting of multi-layered ceramic capacitors is also highly integrated.

A multi-layered ceramic capacitor, one of electronic components, may be mounted on the printed circuit boards of various electronic products, for example, an imaging device such as a liquid crystal display (LCD) and a plasma display panel (PDP), a computer, a personal digital assistant (PDA), mobile phones, and the like, and may serve to charge or discharge electricity.

Such multi-layered ceramic capacitors may be used as components of various electronic devices, due to relatively compact size, relatively high capacity, relative ease of mounting, and the like.

In the meantime, as interest in industry for electric/electronic components has increased recently, multi-layered ceramic capacitors have also been required to have high reliability and high capacity in order to be used in vehicles or infotainment systems.

In particular, as electronic control systems for internal combustion vehicles and electric vehicles are increasing, there is a growing demand for multi-layered ceramic capacitors that may be used in relatively high temperature environments.

PRIOR ART DOCUMENT (Patent Document 1) Japanese Patent Publication No. 2011-018874

SUMMARY

An aspect of the present disclosure is to provide a multi-layered ceramic electronic component, and more particularly, to a high-capacity multi-layered ceramic electronic component having excellent reliability.

According to an aspect of the present disclosure, a multi-layered ceramic electronic component includes a ceramic body including a dielectric layer, and a plurality of first and second internal electrodes opposing each other with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes arranged outside of the ceramic body and electrically connected to the first and second internal electrodes, wherein the dielectric layer comprises a dielectric ceramic composition containing: a base material represented by $(Ba_{1-x}Ca_x)TiO_3$ ($0<x\leq0.09$) as a main component; yttrium (Y) as a first accessory component; magnesium (Mg) as a second accessory component; barium (Ba) or zirconium (Zr), or a mixture thereof, as a third accessory component; manganese (Mn), nickel (Ni), tungsten (W), vanadium (V), or iron (Fe), or mixtures thereof, as a fourth accessory component; and silicon (Si) as a fifth accessory component.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

The embodiments of the present disclosure may be modified into various other forms, and the scope of the present disclosure is not limited to the embodiments described below. Embodiments of the present disclosure may be also provided to more fully describe the present disclosure to those skilled in the art. Therefore, the shapes and sizes of the elements in the drawings may be exaggerated for clarity, and the elements denoted by the same reference numerals in the drawings are the same elements.

Throughout the specification, when an element is referred to as "comprising", it means that it may include other elements as well, rather than excluding other elements unless specifically stated otherwise.

In order to clearly illustrate the present disclosure, parts not related to the description are omitted, and thicknesses are enlarged in order to clearly represent layers and regions, and similar portions are denoted by similar reference numerals throughout the specification.

Hereinafter, preferred embodiments of the present disclosure will be described with reference to the accompanying drawings.

Figure 1:
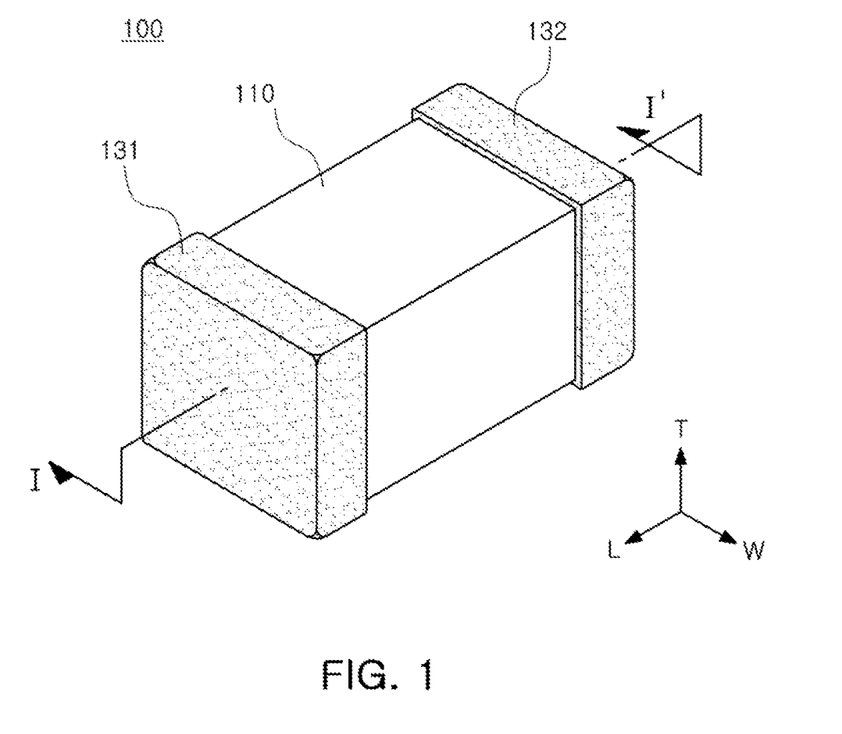
FIG. 1 is a perspective view illustrating a multi-layered ceramic capacitor according to an embodiment of the present disclosure.

FIG. 1 is a perspective view illustrating a multi-layered ceramic capacitor according to an embodiment of the present disclosure.

Figure 2:
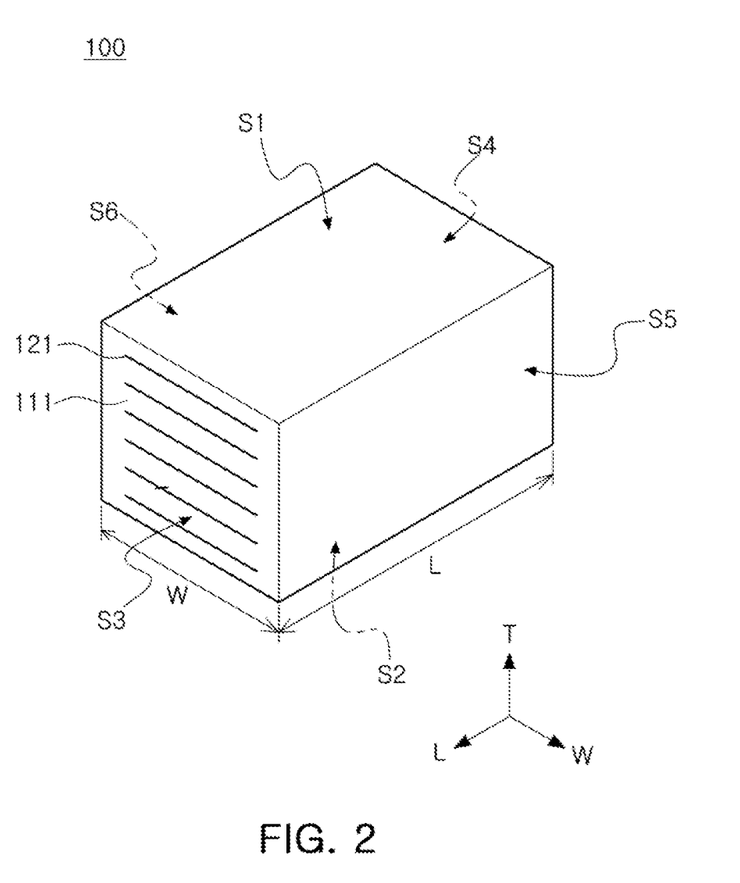
FIG. 2 is a schematic view illustrating a ceramic body according to an embodiment of the present disclosure.

FIG. 2 is a schematic view illustrating a ceramic body according to an embodiment of the present disclosure.

Figure 3:
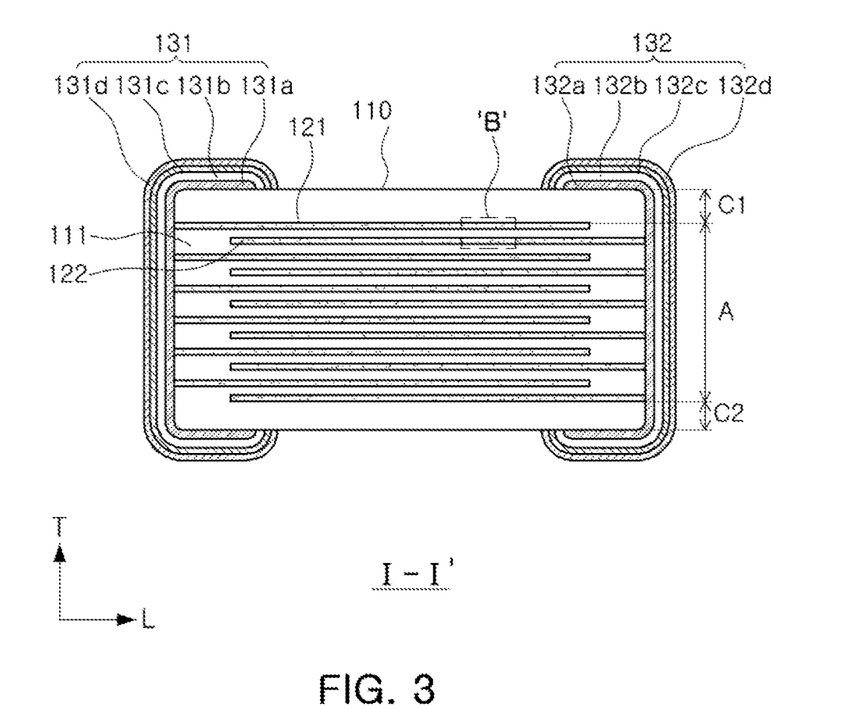
FIG. 3 is a cross-sectional view taken along line I-I' in FIG. 1 according to an embodiment of the present disclosure.

FIG. 3 is a cross-sectional view taken along line I-I' in FIG. 1 according to an embodiment of the present disclosure.

Figure 4:
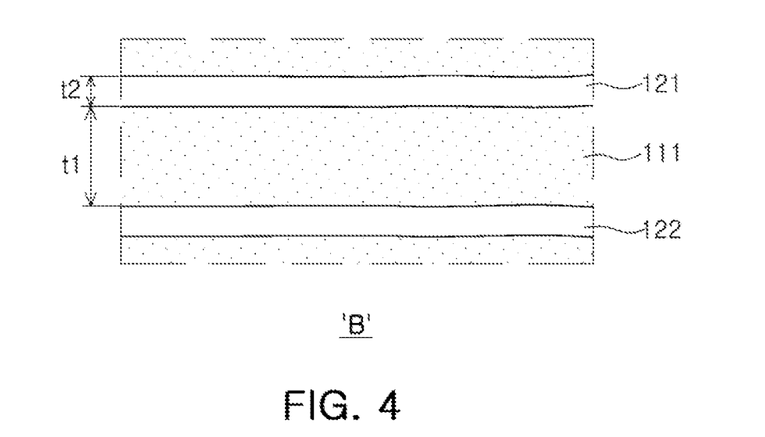
FIG. 4 is an enlarged view of B portion in FIG. 3.

FIG. 4 is an enlarged view of B portion in FIG. 3.

Referring to FIGS. 1 to 4, a multi-layered ceramic electronic component 100 according to an embodiment of the present disclosure may include a ceramic body 110 including a dielectric layer 111, and a plurality of first and second internal electrodes 121 and 122 opposing each other with the dielectric layer 111 interposed therebetween, including first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces S1 to S4 and opposing each other in a third direction; and first and second external electrodes 131 and 132 arranged outside of the ceramic body 110 and electrically connected to the first and second internal electrodes 121 and 122.

Hereinafter, a multi-layered ceramic electronic component according to an embodiment of the present disclosure will be described, but a multi-layered ceramic capacitor may be specifically described, but the present disclosure is not limited thereto.

In a multi-layered ceramic capacitor according to an embodiment of the present disclosure, a 'length direction' of the multi-layered ceramic capacitor refers to an 'L' direction of FIG. 1, a 'width direction' of the multi-layered ceramic capacitor refers to a 'W' direction of FIG. 1, and a 'thickness direction' of the multi-layered ceramic capacitor refers to a 'T' direction of FIG. 1. The 'thickness direction' may be used in the same sense as the direction in which the dielectric layers are stacked up, e.g., as a 'layering direction.'

In an embodiment of the present disclosure, a shape of the ceramic body 110 is not particularly limited in shape, but may be a hexahedral shape, as illustrated.

The ceramic body 110 may include first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces S1 to S4 and opposing each other in a third direction.

The first surface S1 and the second surface S2 may be defined to face each other in a thickness direction of the ceramic body 110, i.e., in a first direction, the third surface S3 and the fourth surface S4 may be defined to face each other in a length direction of the ceramic body 110, i.e., in a second direction, and the fifth surface S5 and the sixth surface S6 may be defined to face each other in a width direction of the ceramic body 110, i.e., in a third direction.

One ends of the plurality of first and second internal electrodes 121 and 122 formed in the ceramic body 110 may be exposed to the third surface S3 or the fourth surface S4 of the ceramic body.

The internal electrodes 121 and 122 may have a first internal electrode 121 and a second internal electrode 122, having different polarities, in pairs.

One end of the first internal electrode 121 may be exposed to the third surface S3, and one end of the second internal electrode 122 maybe exposed to the fourth surface S4.

The other ends of the first internal electrode 121 and the second internal electrode 122 may be formed at regular intervals from the fourth surface S4 or the third surface S3. More specific details thereof will be described later.

The first and second external electrodes 131 and 132 may be formed on the third surface S3 and the fourth surface S4 of the ceramic body, and may be electrically connected to the internal electrodes.

The ceramic body 110 may include an active portion A serving as a portion contributing to capacity formation of the capacitor, and an upper cover portion C1 and a lower cover portion C2 formed respectively above and below the active portion A as upper and lower margin portions.

The active portion A may be formed by repeatedly stacking a plurality of first and second inner electrodes 121 and 122 with a dielectric layer 111 interposed therebetween.

The upper cover portion C1 and the lower cover portion C2 may have the same material and configuration as those of the dielectric layer 111, except that they do not include internal electrodes.

For example, the upper cover portion C1 and the lower cover portion C2 may include a ceramic material, for example, a barium titanate ($BaTiO_3$)-based ceramic material.

The upper cover portion C1 and the lower cover portion C2 may be formed by stacking a single dielectric layer or two or more dielectric layers on upper and lower surfaces of the active portion A in the vertical direction, and may basically serve to prevent the internal electrode from being damaged by physical or chemical stress.

The material forming the first and second internal electrodes 121 and 122 is not particularly limited, and may be formed using a conductive paste including silver (Ag), lead (Pb), platinum (Pt), nickel (Ni), or copper (Cu), or mixtures thereof.

A multi-layered ceramic capacitor according to an embodiment of the present disclosure may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 to form electrostatic capacity, and the second external electrode 132 may be connected to a potential different from that of the first external electrode 131.

The first and second external electrodes 131 and 132 may be respectively arranged on the third surface S3 and the fourth surface S4 in the length direction, i.e., in the second direction of the ceramic body 110, but may extend into the first surface S1 and the second surface S2 in the thickness direction, i.e., in the first direction of the ceramic body 110.

The external electrodes 131 and 132 may be arranged outside of the ceramic body 111, and may include electrode layers 131a and 132a electrically connected to the internal electrodes 121 and 122, and conductive resin layers 131b and 132b arranged on the electrode layers 131a and 132a.

The electrode layers 131a and 132a may include a conductive metal and a glass.

The conductive metal used for the electrode layers 131a and 132a is not particularly limited as long as it is a material that may be electrically connected to the internal electrode for formation of electrostatic capacity. For example, the conductive metal may be one or more selected from the group consisting of copper (Cu), silver (Ag), nickel (Ni), and alloys thereof.

The electrode layers 131a and 132a may be formed by applying a conductive paste prepared by adding glass frit to a powder of the conductive metal, and then firing the paste.

The conductive resin layers 131b and 132b may be formed on the electrode layers 131a and 132a, and may be formed to completely cover the electrode layers 131a and 132a.

Since the conductive resin layers 131b and 132b may be formed to completely cover the electrode layers 131a and 132a, a distance between both end portions of the conductive resin layers 131b and 132b arranged on the first surface S1 and the second surface S2 of the ceramic body 110 may be longer than a distance between both end portions of the electrode layers 131a and 132a arranged on the first surface S1 and the second surface S2 of the ceramic body 110.

A base resin included in the conductive resin layers 131b and 132b is not particularly limited as long as it has bondability and impact absorbing ability, and may be mixed with the conductive metal powder to form a paste. For example, the base resin may include an epoxy resin.

The conductive metal included in the conductive resin layers 131b and 132b is not particularly limited as long as it is a material that may be electrically connected to the electrode layers 131a and 132a. For example, the conductive metal may include one or more selected from the group consisting of copper (Cu), silver (Ag), nickel (Ni), and alloys thereof.

Plated layers 131c, 132c, 131d, and 132d may be further arranged on the conductive resin layers 131b and 132b.

The plated layers 131c, 132c, 131d, and 132d may be arranged on the conductive resin layers 131b and 132b, and may formed to completely cover the conductive resin layers 131b and 132b.

The plated layers 131c, 132c, 131d, and 132d may include nickel (Ni) plated layers 131c and 132c arranged on the conductive resin layers 131b and 132b, and platinum (Pd) plated layers 131d and 132d arranged on the nickel (Ni) plated layers 131c and 132c.

According to an embodiment of the present disclosure, the dielectric layer 111 may include a dielectric ceramic composition containing: a base material represented by $(Ba_{1-x}Ca_x)TiO_3$ ($0<x\leq0.09$) as a main component; Y as a first accessory component; Mg as a second accessory component; Ba or Zr, or a mixture thereof, as a third accessory component; Mn, Ni, W, V, or Fe, or mixtures thereof, as a fourth accessory component; and Si as a fifth accessory component.

As interest in industry for electric/electronic components has increased recently, multi-layered ceramic capacitors are also required to have high reliability and high capacity in order to be used in vehicles or infotainment systems.

In particular, as electronic control systems for internal combustion vehicles and electric vehicles are increasing, there is growing demand for multi-layered ceramic capacitors that may be used in relatively high temperature environments.

At present, the dielectric material of the high-capacity multi-layered ceramic capacitor may mainly be barium titanate ($BaTiO_3$). Since the dielectric material should fire the ceramic body in a reducing atmosphere while using a nickel (Ni) internal electrode, the dielectric material may have resistance to reduction.

However, due to the intrinsic properties of barium titanate ($BaTiO_3$) oxides, the electrostatic capacity may be greatly reduced in an environment of 150° C. or higher, such that it may be difficult to secure electrical characteristics in accordance with the temperature required by the electric/electronic device.

In addition, it is almost impossible to expand the temperature up to 200° C., and it was necessary to develop a multi-layered ceramic capacitor which may be used in a relatively high temperature environment by applying a new composition thereto.

According to an embodiment of the present disclosure, a high-capacity multi-layered ceramic capacitor stably securing the rate of change in high-temperature capacity may be realized, by way of controlling the content of each component in a dielectric layer containing: a base material represented by $(Ba_{1-x}Ca_x)TiO_3$ ($0<x\leq0.09$) as a main component; Y as a first accessory component; Mg as a second accessory component; Ba or Zr, or a mixture thereof, as a third accessory component; Mn, Ni, W, V, or Fe, or mixtures thereof, as a fourth accessory component; and Si as a fifth accessory component.

Specifically, according to an embodiment of the present disclosure, a high-capacity multi-layered ceramic capacitor stably securing the rate of change in high-temperature capacity may be realized, by way of having a dielectric ceramic composition containing a base material represented by $(Ba_{1-x}Ca_x)TiO_3$ ($0<x\leq0.09$) as a main component and the Ca in an amount of 9 moles or less, based on 100 moles of Ti.

Hereinafter, each component of the dielectric ceramic composition included in the dielectric layer according to an embodiment of the present disclosure will be described in more detail.

a) Base Material Powder

According to an embodiment of the present disclosure, the dielectric layer 111 may include a base material represented by $(Ba_{1-x}Ca_x)TiO_3$ ($0<x\leq0.09$) as a main component.

The base material as a main component may be contained in the form of powder, and the calcium (Ca) may be contained in the dielectric layer 111 in an amount of 9 moles or less, based on 100 moles of Ti.

The base material as a main component maybe represented by $(Ba_{1-x}Ca_x)TiO_3$ ("BCT"). The BCT material may be a material used as a base material for a general dielectric, and may be a ferroelectric material.

A high-capacity multi-layered ceramic capacitor stably securing the rate of change in high-temperature capacity may be realized, by way of having the Ca in an amount of 9 moles or less, based on 100 moles of Ti, in $(Ba_{1-x}Ca_x)TiO_3$, which is the base material as a main component.

When the Ca is contained in an amount greater than 9 moles, based on 100 moles of Ti, it may be difficult to stably secure the rate of change in high-temperature capacity.

According to an embodiment of the present disclosure, the base material main component may further include $BaTiO_3$, $BaTi_2O_5$, or $(Ba_{1-x}Ca_x)Ti_2O_5$ ($0<x\leq0.09$), or mixtures thereof.

When the base material as a main component further contains $BaTiO_3$ in addition to $(Ba_{1-x}Ca_x)TiO_3$, the dielectric constant may increase to realize a high-capacity multi-layered ceramic capacitor.

When the base material as a main component further contains $BaTi_2O_5$ or $(Ba_{1-x}Ca_x)Ti_2O_5$ ($0<x\leq0.09$), or a mixture thereof in addition to $(Ba_{1-x}Ca_x)TiO_3$, the rate of change in high-temperature capacity may be secured more stably.

In the case of $BaTi_2O_5$ and $(Ba_{1-x}Ca_x)Ti_2O_5$, the ferroelectric transition temperature thereof may be higher than that of $(Ba_{1-x}Ca_x)TiO_3$ which is the base material as a main component according to an embodiment of the present disclosure.

Therefore, when $BaTi_2O_5$ and $(Ba_{1-x}Ca_x)Ti_2O_5$ are further included in the base material as a main component, the rate of change in high-temperature capacity may be more stably secured due to a relatively high ferroelectric transition temperature characteristics.

In the case of $BaTi_2O_5$ and $(Ba_{1-x}Ca_x)Ti_2O_5$, titanium (Ti) may exist excessively in comparison with $BaTiO_3$ in the prior art. Therefore, there may be problems, for example, that titanium (Ti) may react with nickel (Ni) constituting the internal electrode, and nickel (Ni) may diffuse into the dielectric layer.

As a result, there may be a problem that the dielectric constant of the multi-layered ceramic capacitor maybe lowered.

Therefore, it is preferable that the content of $BaTi_2O_5$ and $(Ba_{1-x}Ca_x)Ti_2O_5$ is appropriately adjusted. In particular, it is preferable that a total amount of $BaTi_2O_5$ and $(Ba_{1-x}Ca_x)Ti_2O_5$ included in the dielectric ceramic composition is 30 mol % or less, based on 100 mol % of the entire base material as a main component.

Meanwhile, the dielectric layer 111 may include dielectric grains, and an average size of the dielectric grains may be 400 nm or less, preferably 200 nm or less, but is not limited thereto.

b) First Accessory Component

According to an embodiment of the present disclosure, the dielectric ceramic composition may contain Y as a first accessory component, and Y, the first accessory component, may include more than 3 moles and less than 6 moles, based on 100 moles of Ti included in the dielectric ceramic composition, in the form of oxide.

The first accessory component may serve to improve the DC-bias characteristic of the multi-layered ceramic capacitor to which the dielectric ceramic composition is applied, and to improve reliability by increasing a high-temperature withstand voltage.

When the content of the first accessory component is 3 moles or less, based on 100 moles of Ti, a crystal grain size of a dielectric grain may increase to 400 nm or more, a leakage current may increase, and a room temperature resistance may decrease.

When the content of the first accessory component is at least 6 moles, based on 100 moles of Ti, a secondary phase $(Y_2Ti_2O_7)$ maybe generated and a dielectric breakdown due to the deterioration of the insulation resistance (IR) may increase at relatively high temperatures.

c) Second Accessory Component

According to an embodiment of the present disclosure, the dielectric ceramic composition may contain Mg as a second accessory component.

Mg as a second accessory component may be contained in an amount of 1.5 moles or more and 2.5 moles or less, based on 100 moles of Ti, in the form of oxide.

Mg as a second accessory component may be contained in an amount of 1.5 moles or more and 2.5 moles or less, based on 100 moles of Ti, in the form of oxide, such that the grain size of the dielectric grain may be controlled according to an embodiment of the present disclosure.

When the content of the second accessory component is less than 1.5 moles, based on 100 moles of Ti, the rare earth metal oxide may accelerate formation of the crystal grains of the dielectric grains, to increase the grain size and to deteriorate the dielectric constant characteristics in accordance with the temperature.

When the content of the second accessory component exceeds 2.5 moles, based on 100 moles of Ti, the rare earth oxide may not contribute to formation of crystal grains of the dielectric grains and may be present in grain boundaries, to deteriorate high-temperature insulation resistance characteristics.

d) Third Accessory Component

According to an embodiment of the present disclosure, the dielectric ceramic composition may contain Ba or Zr, or a mixture thereof, as a third accessory component.

The dielectric ceramic composition may contain Ba or Zr, or a mixture thereof, as a third accessory component in an amount of 1.5 moles or more and 3.5 moles or less, based on 100 moles of Ti.

The third accessory component may contribute to the generation of crystal grains of dielectric grains, and may serve to control the dielectric constant.

The dielectric ceramic composition may contain Ba or Zr, or a mixture thereof, as a third accessory component in an amount of 1.5 moles or more and 3.5 moles or less, based on 100 moles of Ti, to achieve target characteristics such as the dielectric constant of the multi-layered ceramic capacitor, and the like.

When the content of the third accessory component is less than 1.5 moles, based on 100 moles of Ti, target characteristics such as the dielectric constant of the multi-layered ceramic capacitor, and the like may not be obtained.

When the content of the third accessory component is more than 3.5 moles, based on 100 moles of Ti, the third accessory component may not contribute to the formation of crystal grains of the dielectric grain, to deteriorate insulation resistance characteristic.

e) Fourth Accessory Component

According to an embodiment of the present disclosure, the dielectric ceramic composition may further contain Mn, Ni, W, V, or Fe, or mixtures thereof, as a fourth accessory component.

The dielectric ceramic composition may contain Mn, Ni, W, V, or Fe, or mixtures thereof, as the fourth accessory component in an amount of 0.2 moles or more and 0.7 moles or less, based on 100 moles of Ti.

The fourth accessory component may serve to improve a firing temperature drop and a high-temperature withstand voltage characteristics of the multi-layered ceramic capacitor to which the dielectric ceramic composition is applied.

The dielectric ceramic composition may contain Mn, Ni, W, V, or Fe, or mixtures thereof, as the fourth accessory component in an amount of 0.2 moles or more and 0.7 moles or less, based on 100 moles of Ti, to improve the high-temperature withstand voltage characteristics of the multi-layered ceramic capacitor.

The firing temperature at which the content of the fourth accessory component is less than 0.2 moles, based on 100 moles of Ti, may increase, and the high-temperature withstand voltage characteristics may somewhat decrease.

When the content of the fourth accessory component is more than 0.7 moles, based on 100 moles of Ti, the high-temperature withstand voltage characteristics and the room temperature resistivity may decrease.

f) Fifth Accessory Component

According to an embodiment of the present disclosure, the dielectric ceramic composition may contain Si as a fifth accessory component.

The dielectric ceramic composition may contain Si as a fifth accessory component in an amount of 1.2 moles or more and 2.2 moles or less, based on 100 moles of Ti.

The fifth accessory component may serve to improve the firing temperature drop and the high-temperature withstand voltage characteristics of the multi-layered ceramic capacitor to which the dielectric ceramic composition is applied.

When the content of the fifth accessory component is less than 1.2 moles, based on 100 moles of Ti, the firing temperature may increase.

When the content of the fifth accessory component exceeds 2.2 moles, based on 100 moles of Ti, the high-temperature withstand voltage characteristics may decrease.

The content of the first to the fifth accessory components according to an embodiment of the present disclosure may be measured by inductively coupled plasma (ICP) analysis and electron probe microanalysis (SPMA).

When the content of the first to the fifth accessory components is measured by inductively coupled plasma (ICP) analysis, ICP mass analysis in which a plurality of ionized atoms generated in an ICP light source are introduced into a mass spectrometer for quantitative analysis, an ICP spectrometric analysis in which a specimen is mixed in a discharge plasma generated by flowing a high frequency current through a coil in flow of inert gas for spectroscopic analysis, or the like, may be applied.

Meanwhile, EPMA, which is a nondestructive analysis method, may be a method capable of having high spatial resolution and performing qualitative and quantitative analysis of micron-level fine elements, using X-rays generated when an electron beam accelerated at high speed collides with a material.

Referring to FIG. 4, in a multi-layered ceramic electronic component according to an embodiment of the present disclosure, a thickness (t1) of the dielectric layer 111 interposed between the first and second internal electrodes 121 and 122 and a thickness (t2) of the first and second internal electrodes 121 and 122 satisfy the relationship t1>2x t2.

For example, according to an embodiment of the present disclosure, the thickness (t1) of the dielectric layer 111 may be larger than twice the thickness (t2) of the internal electrodes 121 and 122.

Generally, electronic components in a high voltage electric/electronic device may have a reliability problem due to a decrease in dielectric breakdown voltage under a relatively high voltage environment.

The multi-layered ceramic capacitor according to an embodiment of the present disclosure may improve dielectric breakdown voltage characteristics by increasing the thickness (t1) of the dielectric layer 111 larger than twice the thickness (t2) of the internal electrodes 121 and 122 to prevent a decrease in dielectric breakdown voltage under a relatively high voltage environment, and by increasing a thickness of the dielectric layer which is a distance between the internal electrodes.

When the thickness (t1) of the dielectric layer 111 is twice or less than the thickness (t2) of the internal electrodes 121 and 122, the dielectric breakdown voltage may decrease due to a relatively thin dielectric layer, which is a distance between the internal electrodes.

The thickness (t2) of the internal electrode may be less than 1.0 μm, and the thickness (t1) of the dielectric layer may be less than 2.8 μm, but is not necessarily limited thereto.

Figure 5:
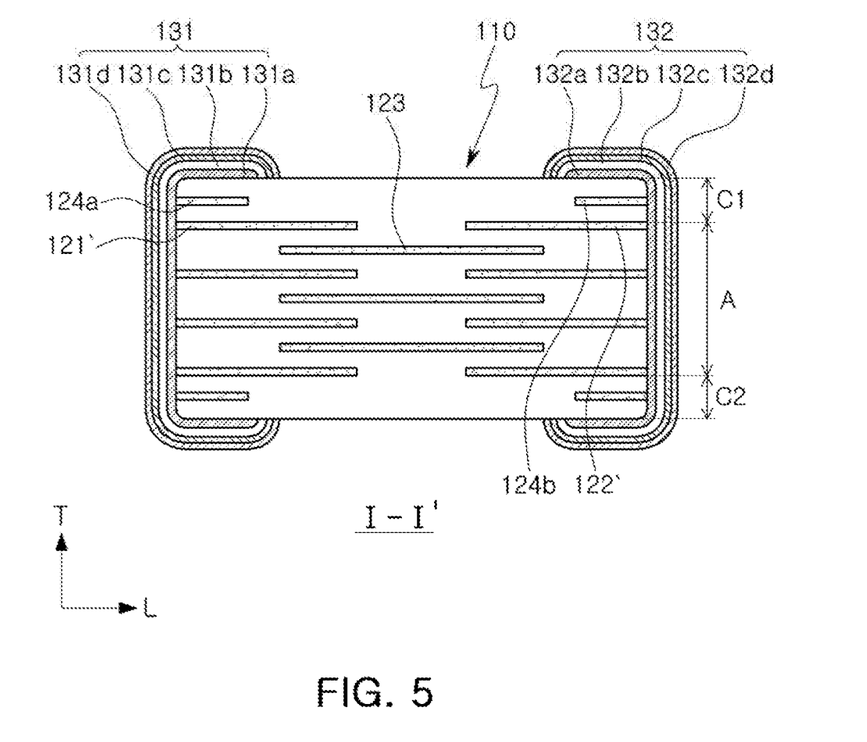
FIG. 5 is a cross-sectional view taken along line I-I' in FIG. 1 according to another embodiment of the present disclosure.

FIG. 5 is a cross-sectional view taken along line I-I' in FIG. 1 according to another embodiment of the present disclosure.

Referring to FIG. 5, a multi-layered ceramic capacitor according to another embodiment of the present disclosure may further include a plurality of floating electrodes 123 which are staggered with first and second internal electrodes 121' and 122' in a ceramic body 110 in a thickness direction, and both end portions thereof overlap a portion of the first and second internal electrodes 121' and 122', respectively.

The first and second internal electrodes 121' and 122' may be electrodes having different polarities, may be formed to be spaced apart from each other on at least one surface of a ceramic sheet forming a dielectric layer 111, and may be arranged to be exposed through both ends of the ceramic body 110 in the ceramic body 110.

The first and second internal electrodes 121' and 122' exposed through both ends of the ceramic body 110 may be electrically connected to first and second external electrodes 131 and 132, respectively.

The plurality of floating electrodes 123 may be staggered alternately with the first and second internal electrodes 121' and 122' in the ceramic body 110 in the thickness direction of the ceramic body 110, and a portion of both end portions of them may partially overlap a portion of mutually spaced apart end portions of the first and second internal electrodes 121' and 122', respectively.

The plurality of floating electrodes 123 may be spaced apart from both ends of the ceramic body 110 by 5% or more of the total length of the ceramic body 110.

Meanwhile, according to another embodiment of the present disclosure, first and second dummy electrodes 124a and 124b may be arranged to be spaced apart from each other in an upper cover portion C1 and a lower cover portion C2 arranged respectively above and below an active portion A.

The first dummy electrode 124a may be exposed on the same plane as an outer surface of the ceramic body 110 on which the first inner electrode 121' is exposed, and the second dummy electrode 124b may be exposed on the same plane as an outer surface of the ceramic body 110 on which the second inner electrode 122' is exposed.

The bending strength of the multi-layered ceramic capacitor may be improved by exposing the first dummy electrode 124a on the same plane as an outer surface of the ceramic body 110 on which the first inner electrode 121' is exposed, and by exposing the second dummy electrode 124b on the same plane as an outer surface of the ceramic body 110 on which the second inner electrode 122' is exposed.

Hereinafter, a method of manufacturing a multi-layered ceramic electronic component according to an embodiment of the present disclosure will be described, but the present disclosure is not limited thereto.

In a method of manufacturing a multi-layered ceramic electronic component according to an embodiment of the present disclosure, a slurry including a dielectric ceramic composition containing: a base material represented by $(Ba_{1-x}Ca_x)TiO_3$ (0<x≤0.09) as a main component; Y as a first accessory component; Mg as a second accessory component; Ba or Zr, or a mixture thereof, as a third accessory component; Mn, Ni, W, V, or Fe, or mixtures thereof, as a fourth accessory component; and Si as a fifth accessory component; may be applied on a carrier film, and may then be dried to form a plurality of ceramic green sheets, to form a dielectric layer.

The ceramic green sheet may be prepared by mixing a ceramic powder, a binder, and a solvent to prepare a slurry, and by subjecting the slurry to a doctor blade method to form a sheet having a thickness of several micrometers.

Next, an internal electrode conductive paste having an average nickel particle size of 0.1 to 0.2 μm and containing nickel powder of 40 to 50 parts by weight may be provided.

The internal electrode conductive paste may be applied on the green sheet by a screen printing method to form internal electrodes, and then green sheets on which internal electrode patterns are arranged may be stacked to form a ceramic body 110.

Next, an electrode layer including one or more conductive metal selected from the group consisting of copper (Cu), silver (Ag), nickel (Ni), and alloys thereof, and glass may be formed outside of the ceramic body.

The glass is not particularly limited, and a material having the same composition as glass used for manufacturing an external electrode of a conventional multi-layered ceramic capacitor may be used.

The electrode layer may be formed on the upper and lower surfaces and the end portions of the ceramic body to be electrically connected to the first and second internal electrodes, respectively.

The electrode layer may contain 5% by volume or more of glass, based on the conductive metal.

Next, a conductive resin composition may be applied on the electrode layers 131a and 132a, and then cured, to form the conductive resin layers 131b and 132b.

The conductive resin layers 131b and 132b may include one or more conductive metal selected from the group consisting of copper (Cu), silver (Ag), nickel (Ni), and alloys thereof, and a base resin, and the base resin may be an epoxy resin.

Next, nickel (Ni) plated layers 131c and 132c may be formed on the conductive resin layers 131b and 132b, and tin (Sn) plated layers 131d and 132d may be formed on the nickel (Ni) plated layers 131c and 132c. The tin (Sn) may be replaced with palladium (Pd).

Examples according to an embodiment of the present disclosure, and comparative examples prepared for comparison of characteristics were manufactured by the following method, and electrical characteristics of each case were compared. All of the molar amounts described in the Examples are based on 100 moles of Ti.

First, Ca in a base material as a main component was contained in an amount of 8 moles, based on 100 moles of Ti, Zr as a third accessory component was contained in an amount of 2.0 moles, Mn in the transition metal as a fourth accessory component was contained in an amount of 0.55 moles, Si as a fourth accessory component and a firing aid was contained in an amount of 2.0 moles, to prepare a dielectric ceramic mixture.

3.0 moles, 4.0 moles, 5.0 moles, and 6.0 moles of Y as a first accessory component in an oxide form were respectively added to the prepared ceramic mixture to prepare each ceramic mixture sample, 1.5 moles, 2.0 moles, 2.5 moles, and 3.0 moles of Mg as a second accessory component were respectively added to the prepared ceramic mixture to prepare each ceramic mixture sample, and a multi-layered ceramic capacitor was fabricated using each of the samples.

It is necessary to secure a mean time to failure (MTTF) of 20 hours or more under a relatively high temperature acceleration condition of 180° C. and 20 V/μm, to guarantee a relatively long service life in an environment of 150° C. or higher.

The MTTF refers to an average time period until failure of an electronic component, which means an average failure time period corresponding to a time period until a non-repairable case, for example, a time period to occurrence of failure of an electronic component.

The dielectric constant characteristic according to temperature should have a dielectric constant within the range of ±15° C., based on the dielectric constant at 25° C. in the range of −55° C. to 150° C. The grain size of the dielectric grains is preferably 200 nm to 400 nm, and more preferably 200 nm or less.

When Mg as a second accessory component in the form of oxide is in an amount of 1.5 moles, the grain size of the dielectric grains after firing of all the compositions may be 400 nm or more, not to satisfy desired characteristics of a product therefrom.

When Mg as a second accessory component in the form of oxide is in an amount of 3.0 moles, MTTF was measured to be within 5 hours of MTTF in all cases of which Y oxide as a rare earth metal is in an amount of 3.0 to 6.0 moles, not to satisfy desired reliability of a product therefrom.

When Mg as a second accessory component in the form of oxide is in an amount of 2.0 moles, MTTF according to respective content of Y oxide as a rare earth metal was measured to be 35.6 hours at 4.0 moles and 27.1 hours at 5.0 moles, respectively, to satisfy desired reliability of a product therefrom.

When Mg in the form of oxide is in an amount of 2.0 moles as described above, MTTF according to respective content of Y oxide as a rare earth metal was measured to be 15.3 hours at 3.0 moles and 5.8 hours at 6.0 moles, respectively, not to satisfy desired reliability of a product therefrom.

Meanwhile, when Mg as a second accessory component in the form of oxide is in an amount of 2.5 moles, MTTF according to respective content of Y oxide as a rare earth metal was measured to be 30.6 hours at 4.0 moles and 24.1 hours at 5.0 moles, respectively, to satisfy desired reliability of a product therefrom.

When Mg in the form of oxide is in an amount of 2.5 moles as described above, MTTF according to respective content of Y oxide as a rare earth metal was measured to be 12.7 hours at 3.0 moles and 9.5 hours at 6.0 moles, respectively, not to satisfy desired reliability of a product therefrom.

According to an embodiment of the present disclosure, a high-capacity multi-layered ceramic capacitor stably securing the rate of change in high-temperature capacity may be realized, by way of controlling the content of each component in the dielectric layer containing a base material represented by $(Ba_{1-x}Ca_x)TiO_3$ $(0<x\leq 0.09)$ as a main component, Y as a first accessory component, Mg as a second accessory component, Ba or Zr, or a mixture thereof, as a third accessory component, Mn, Ni, W, V, or Fe, or mixtures thereof, as a fourth accessory component, and Si as a fifth accessory component.

While exemplary embodiments have been shown and described above, it will be apparent to those skilled in the art that modifications and variations could be made without departing from the scope of the present disclosure as defined by the appended claims.

What is claimed is:

1. A multi-layered ceramic electronic component comprising:
   a ceramic body including a dielectric layer, and a plurality of first and second internal electrodes opposing each other with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
   first and second external electrodes arranged outside of the ceramic body and electrically connected to the first and second internal electrodes,
   wherein the dielectric layer comprises a dielectric ceramic composition containing:
   a base material represented by $(Ba_{1-x}Ca_x)TiO_3$ $(0<x\leq 0.09)$ as a main component,
   a first accessory component of yttrium (Y),
   a second accessory component of magnesium (Mg),
   a third accessory component is selected from the group consisting of barium (Ba), zirconium (Zr), and a mixture thereof,
   a fourth accessory component is selected from the group consisting of manganese (Mn), nickel (Ni), tungsten (W), vanadium (V), iron (Fe), and mixtures thereof, a fifth accessory component of silicon (Si), and
wherein a total amount of Ba and Zr included in the dielectric ceramic composition as the third accessory component is 1.5 moles or more and 3.5 moles or less, based on 100 moles of Ti.

2. The multi-layered ceramic electronic component according to claim 1, wherein the dielectric ceramic composition comprises Y in an amount more than 3 moles and less than 6 moles, based on 100 moles of Ti, in the form of oxide.

3. The multi-layered ceramic electronic component according to claim 1, wherein the dielectric ceramic composition comprises Mg in an amount 1.5 moles or more and 2.5 moles or less, based on 100 moles of Ti, in the form of oxide.

4. The multi-layered ceramic electronic component according to claim 1, wherein a total amount of Mn, Ni, W, V, and Fe included in the dielectric ceramic composition is 0.2 moles or more and 0.7 moles or less, based on 100 moles of Ti.

5. The multi-layered ceramic electronic component according to claim 1, wherein the dielectric ceramic composition comprises Si in an amount 1.2 moles or more and 2.2 moles or less, based on 100 moles of Ti.

6. The multi-layered ceramic electronic component according to claim 1, wherein the base material further comprises $BaTiO_3$, $BaTi_2O_5$, or $(Ba_{1-x}Ca_x)Ti_2O_5$, or mixtures thereof (0<x≤0.09).

7. The multi-layered ceramic electronic component according to claim 6, wherein an amount $BaTi_2O_5$ and $(Ba_{1-x}Ca_x)Ti_2O_5$ included in the dielectric ceramic composition is 30 mol % or less each, based on 100 mol % of the base material.

8. The multi-layered ceramic electronic component according to claim 1, wherein dielectric grains contained in the dielectric layer have an average size of 200 nm or less.

9. The multi-layered ceramic electronic component according to claim 1, wherein a thickness (t1) of the dielectric layer interposed between the first and second internal electrodes is less than 2.8 μm.

10. The multi-layered ceramic electronic component according to claim 1, wherein a thickness (t2) of the first and second internal electrodes is less than 1.0 μm, respectively.

11. The multi-layered ceramic electronic component according to claim 1, wherein a thickness (t1) of the dielectric layer and a thickness (t2) of the first and second internal electrodes satisfy the relationship t1>2x t2.

12. The multi-layered ceramic electronic component according to claim 1, further comprising a plurality of floating electrodes which are staggered with the first and second internal electrodes in the ceramic body in a thickness direction, and both end portions thereof overlap a portion of the first and second internal electrodes, respectively.

13. The multi-layered ceramic electronic component according to claim 1, wherein the ceramic body comprises: an active portion including a plurality of internal electrodes opposing each other with the dielectric layer interposed therebetween; cover portions formed above and below the active portion; and first and second dummy electrodes which are arranged to be spaced apart from each other in the cover portions.

14. The multi-layered ceramic electronic component according to claim 13, wherein the first dummy electrode is exposed on the same surface as a surface of the ceramic body on which the first internal electrode is exposed, and the second dummy electrode is exposed on the same surface as a surface of the ceramic body on which the second internal electrode is exposed.

15. A multi-layered ceramic electronic component comprising:
a ceramic body including a dielectric layer, and a plurality of first and second internal electrodes opposing each other with the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; and
first and second external electrodes arranged outside of the ceramic body and electrically connected to the first and second internal electrodes,
wherein the dielectric layer comprises a dielectric ceramic composition containing:
a base material represented by $(Ba_{1-x}Ca_x)TiO_3$ (0<x≤0.09) as a main component and further comprising $BaTiO_3$, $BaTi_2O_5$, $(Ba_{1-x}Ca_x)Ti_2O_5$, or mixtures thereof (0>x≤0.09),
a first accessory component of yttrium (Y),
a second accessory component of magnesium (Mg),
a third accessory component is selected from the group consisting of barium (Ba), zirconium (Zr), and a mixture thereof,
a fourth accessory component is selected from the group consisting of manganese (Mn), nickel (Ni), tungsten (W), vanadium (V), iron (Fe), and mixtures thereof, and
a fifth accessory component of silicon (Si).

16. The multi-layered ceramic electronic component according to claim 15, wherein an amount $BaTi_2O_5$ and $(Ba_{1-x}Ca_x)Ti_2O_5$ included in the dielectric ceramic composition is 30 mol % or less each, based on 100 mol % of the base material.

17. The multi-layered ceramic electronic component according to claim 15, wherein the dielectric ceramic composition comprises Y in an amount more than 3 moles and less than 6 moles, based on 100 moles of Ti, in the form of oxide.

18. The multi-layered ceramic electronic component according to claim 15, wherein the dielectric ceramic composition comprises Mg in an amount 1.5 moles or more and 2.5 moles or less, based on 100 moles of Ti, in the form of oxide.

19. The multi-layered ceramic electronic component according to claim 1, wherein at total amount of Ba and Zr included in the dielectric ceramic composition is 1.5 moles or more and 3.5 moles or less, based on 100 moles of Ti.

* * * * *